Aug. 7, 1928. 1,679,437

D. L. MIDDENDORF

CRACKLED WARE AND SEMIFINISHED BLANK THEREFOR

Filed Aug. 20, 1926

David L. Middendorf
INVENTOR.

BY
ATTORNEYS.

Patented Aug. 7, 1928.

1,679,437

UNITED STATES PATENT OFFICE.

DAVID L. MIDDENDORF, OF COLUMBUS, OHIO, ASSIGNOR TO THE FEDERAL GLASS COMPANY, OF COLUMBUS, OHIO, A CORPORATION OF OHIO.

CRACKLED WARE AND SEMIFINISHED BLANK THEREFOR.

Application filed August 20, 1926. Serial No. 130,464.

My invention relates to crackled ware and a semi-finished blank therefor. It relates particularly to that class of table ware wherein ornamental configurations are produced on the glass by the application of moisture thereto in one form or another.

In the past, it has been customary to produce crackled ware by gathering glass upon a blow pipe, introducing "puff" air into the blank and then subjecting the blank to moisture. The usual methods of accomplishing this have been by immersion of the blank or blow pipe into a body of water or by subjecting the blank or blow pipe to moisture-laden sawdust. Usually, it has been customary to subsequently subject the blank to a flame to close up the openings which have been produced in the glass by moisture.

The making of crackled ware by these methods has resulted in the production of cracks in the glass of such a nature that the resulting product has always been extremely delicate. Furthermore, the blown blank on the end of the blow pipe must always have its upper end removed and it has been necessary to effect this removal by careful cutting and then by polishing the upper end of the glass. This has greatly slowed up the production of these articles and has resulted in a very high cost.

I have devised a new method of producing crackled ware and the performance of such method has resulted in the production of new articles of manufacture. In other words, the use of this method has resulted in the production, first, of a new type of semi-finished blank for the making of crackled ware, that is, a blank which has the upper end and neck thereof still on its body. Furthermore, it has produced a new finished article of crackled ware, wherein the crackles take the form of delicate traceries which are in the nature of round-bottom furrows.

My invention relates particularly to the nature of the crackles or cracks in the glass and it is illustrated in connection with the drawings wherein similar characters of reference designate corresponding parts and wherein Figure 1 is a side elevation of a section of a tumbler with my form of crackles therein.

Figure 1:
Figure 2:
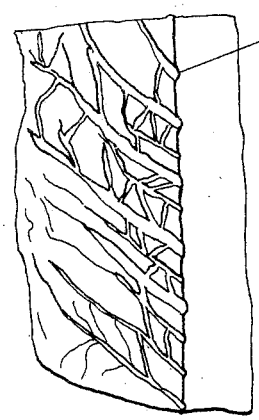
Figure 2 is a perspective view of the structure shown in Figure 1 and illustrating the nature of the crackles.

In the drawings, with particular reference to Figures 1 and 2, it will be noted that the body portion 1 of my crackled ware is provided with a plurality of crackles 2. One important thing about these crackles is the fact that the bases thereof are rounded as at 3. In other words, these cracks or crackles are really furrows instead of being actual cracks. Their rounded bases very greatly decrease, if they do not completely nullify, the tendency of the crackles to extend more deeply into the glass.

One of the methods which I use for producing this new article of manufacture consists of spraying the interior of the blank mold with moisture-laden air immediately before the deposit of a charge of glass therein. This method is illustrated in my application, Serial No. 85,872, filed February 4, 1926. It produces an article wherein the crackles take the appearance of lines which vary from relatively heavy markings to delicate traceries corresponding to the markings on a frosted window pane. Unlike the hand-made crackled ware, they are less uniform in arrangement and prominence and, therefore, produce a novel appearance because of this very lack of uniformity.

Figure 3:
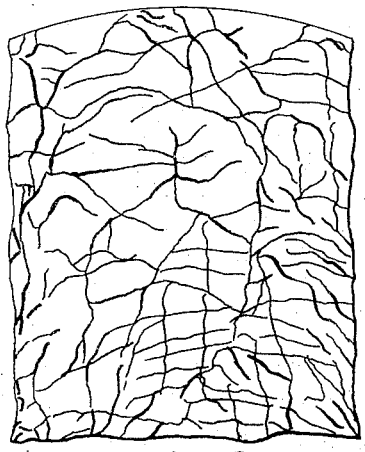
Figure 3 is a side elevation of a tumbler made according to the old hand method and illustrating the crackles or cracks therein.
Figure 4:
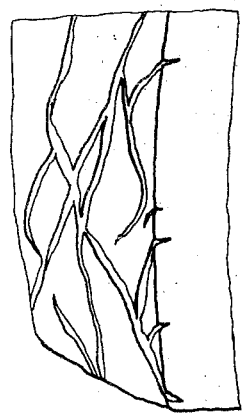
Figure 4 is a perspective view of the structure shown in Figure 3 and illustrating the crackles or cracks produced by the previously-known methods.

The nature of the furrows in my new article of manufacture is best understood by comparison with the crackles produced under the old hand method, as shown in Figures 3 and 4. This is particularly true, due to the fact that these drawings are made from actual photographs. By examining Figure 4, it will be noted that the cracks or crackles have their bases terminating in points or, at least, in wedge-like grooves which have a tendency to extend themselves more deeply into the glassware.

Figure 5:
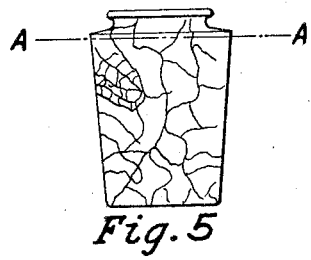
Figure 5 is a sectional view of a mold with one of my semi-finished blanks therein.

My finished crackled ware is naturally stronger than the finished crackled ware hitherto known in view of the different nature of the crackles. There is a further great advantage, however, in having my new form of crackles in that the semi-finished blank of the type shown in Figure 5 may be removed from its mold and may have the top cut off by a thin flame, as is customary in such types of ware. Owing to the fact that the crackles in my type of semi-finished blank are merely superficial and are in the nature of furrows, there is less tendency of the cutting flame to force these crackles into the glass and disrupt the glass entirely. The result is that it is possible to utilize the flame and cut off the semi-finished blank with greatly reduced difficulty and with a greatly reduced loss of production.

Having thus described my invention, what I claim is:

1. An article of finished glassware having crackles therein in the form of round-bottom furrows.

2. A semi-finished blank for the making of finished glassware having crackles therein in the form of round-bottom furrows.

3. An article of glassware having crackles superficially formed therein, the said crackles being in the form of furrows which are relatively shallow and broad.

4. A semi-finished blank for the making of finished glassware which has been pressed and then blown and which has its cap thereon, the said blank having crackles therein in the form of furrows which are relatively shallow and broad.

In testimony whereof I hereby affix my signature.

DAVID L. MIDDENDORF.